INVENTORS
W. W. BLAKESLEE
P. J. GRUNFELDER
E. K. NADOLNY
L. L. SEVEBECK
R. E. VOGELI

Albert R. Hodges
ATTORNEY

Jan. 31, 1967  W. W. BLAKESLEE ET AL  3,301,958
MAGNETIC REPERTORY CALLER
Filed Aug. 12, 1963  8 Sheets-Sheet 4
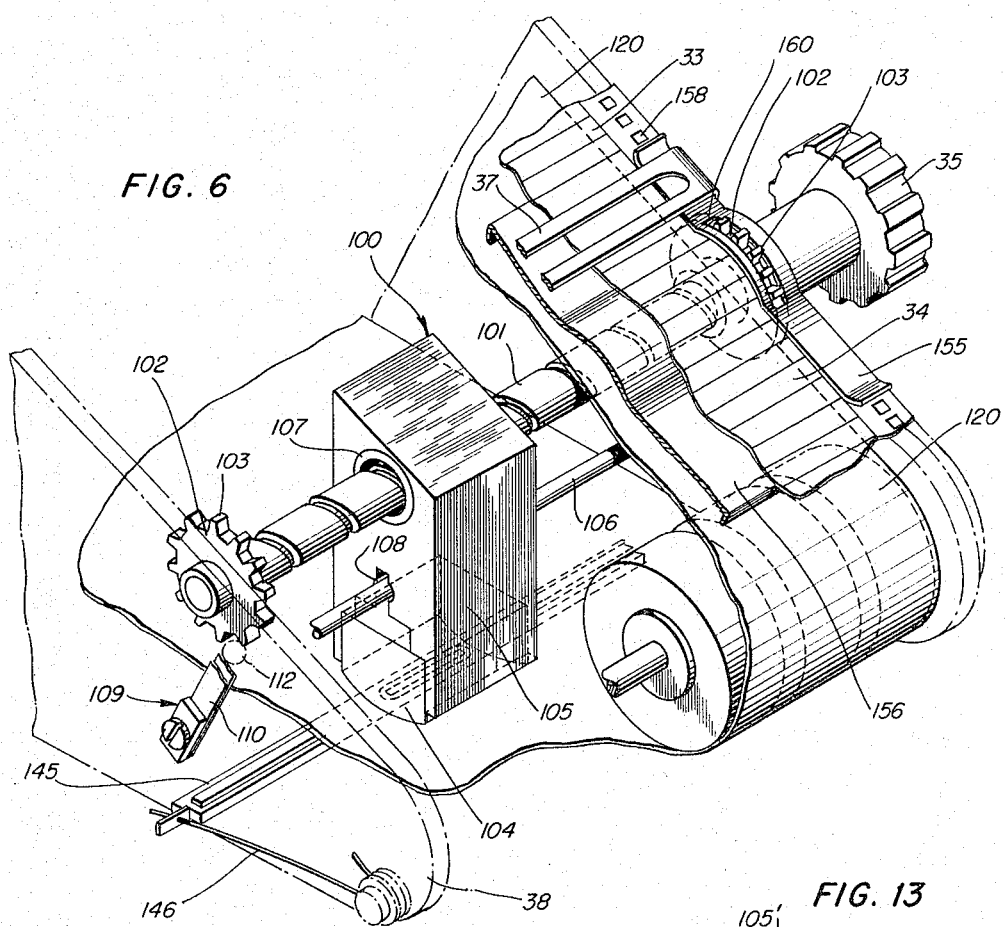
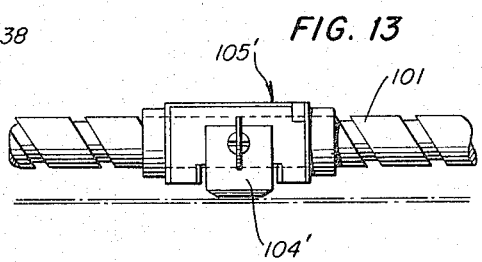
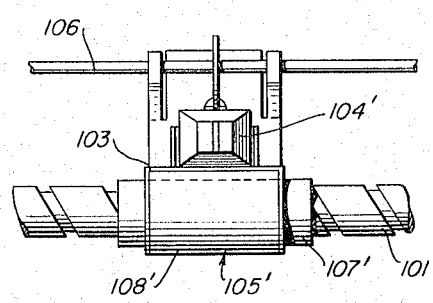
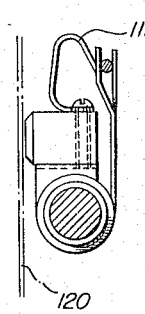
INVENTORS
W.W. BLAKESLEE
P.J. GRUNFELDER
E.K. NADOLNY
L.L. SEVEBECK
R.E. VOGELI
BY Albert R. Hodges
ATTORNEY Jan. 31, 1967 W. W. BLAKESLEE ETAL 3,301,958
MAGNETIC REPERTORY CALLER
Filed Aug. 12, 1963 8 Sheets-Sheet 5

INVENTORS
W. W. BLAKESLEE
P. J. GRUNFELDER
E. K. NADOLNY
L. L. SEVEBECK
R. E. VOGELI
BY Albert R. Hodges
ATTORNEY

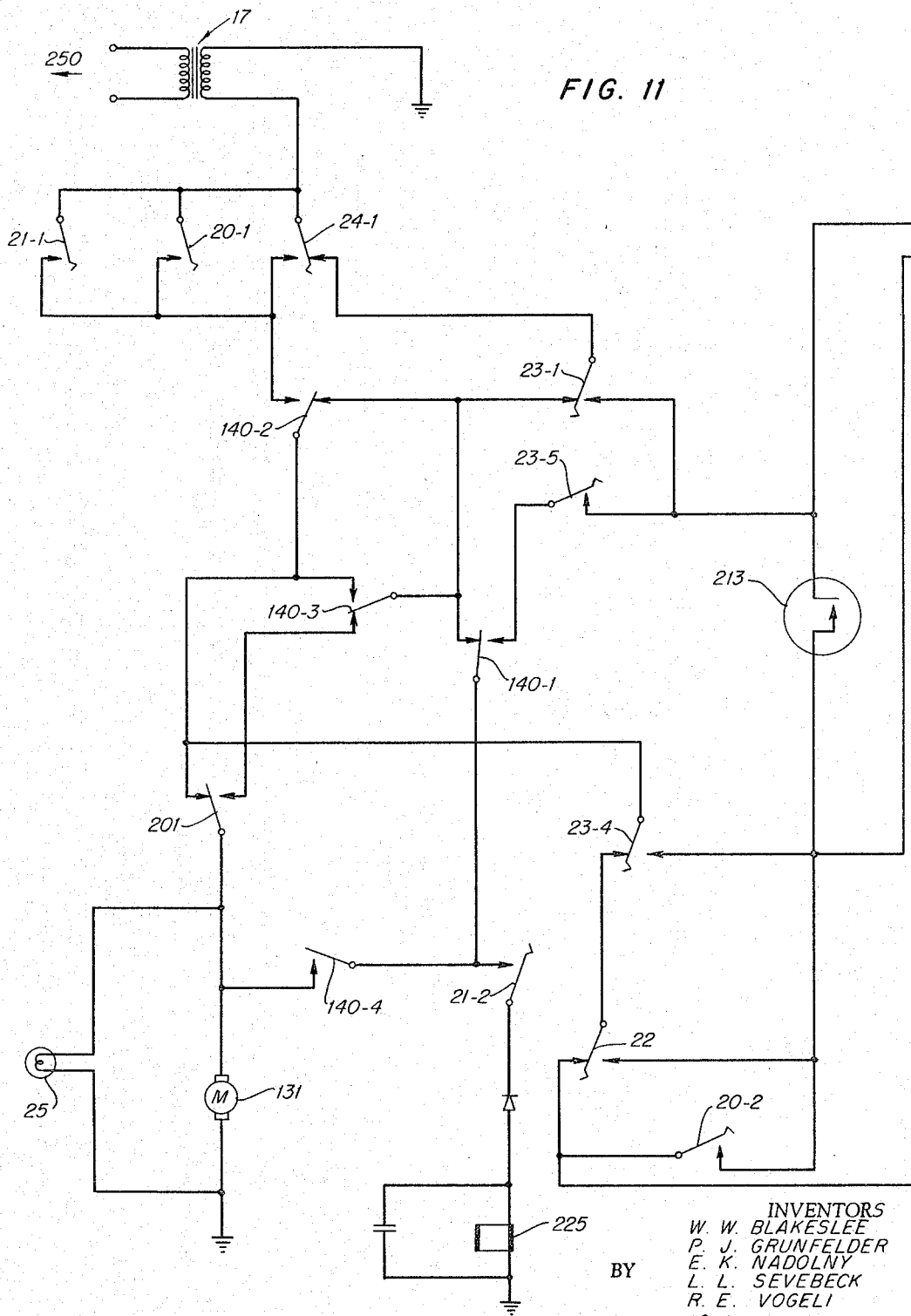

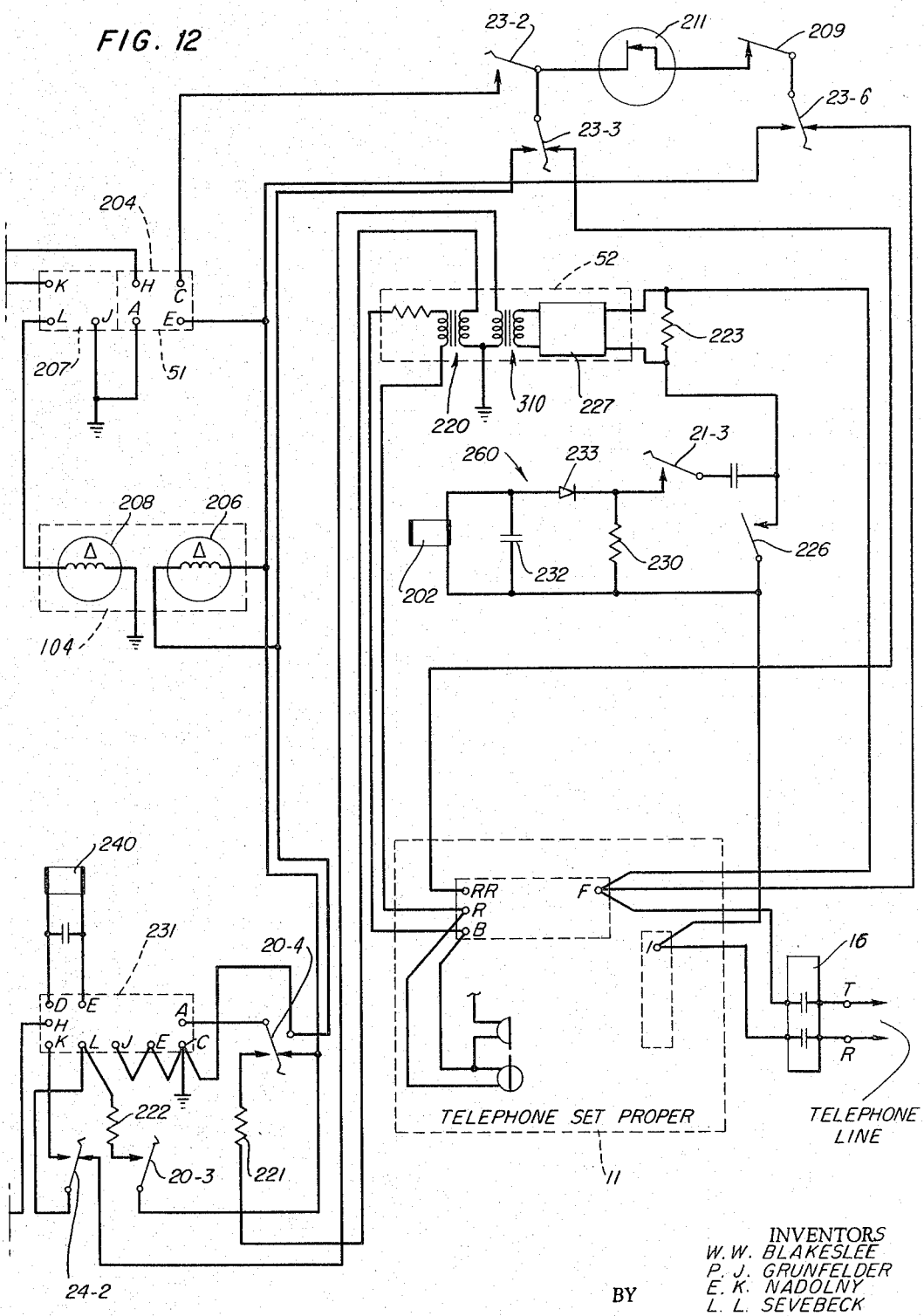

INVENTORS
W. W. BLAKESLEE
P. J. GRUNFELDER
E. K. NADOLNY
L. L. SEVEBECK
R. E. VOGELI
BY Albert R. Hodges
ATTORNEY __United States Patent Office__ 3,301,958
Patented Jan. 31, 1967

3,301,958
MAGNETIC REPERTORY CALLER
William W. Blakeslee, Raritan, Philip J. Grunfelder, Mountainside, Edmund K. Nadolny, Ramsey, and Laurin L. Sevebeck, Mountainside, N.J., and Rudolf E. Vogeli, Brooklyn, N.Y., assignors to Western Electric Company, Incorporated, New York, N.Y., a corporation of New York
Filed Aug. 12, 1963, Ser. No. 301,479
9 Claims. (Cl. 179—6)

This invention relates to telephone signalling equipment and, more particularly, to magnetic repertory signalling equipment.

Presently, a large portion of the calls made by telephone users are made to a limited number of stations, and of these there are usually only a few stations which are called repeatedly. In the situation where a subscriber has a conventional dial type telephone set connected to a telephone exchange, it is necessary for such subscriber to manipulate manually the dialing mechanism of his set a plurality of times in dialing a code associated with a subscriber or station to be called. Generally in instituting a local call, it is necessary to dial a combination of letters and/or numbers usually about seven, each one of which must be successively selected by appropriate manipulation of the dialing mechanism. Further, with the advent of direct distance dialing, there has been an increase in the number of letters and/or numbers that must be dialed to initiate a long distance call. Accordingly, the need has been felt for means to expedite the initiation of telephone calls by eliminating the manipulations normally necessary to effect the transmission of digit signals or dialing informations, including, for example, digital pulses and/or multifrequency oscillations.

An object of this invention is to provide new and improved telephone signalling equipment capable of initiating telephone calls without extensive manual operation.

A further object of this invention is to provide improved repertory calling equipment employing a magnetic recording medium and affording a subscriber the opportunity to record a plurality of calling informations, each of which may be utilized selectively for calling a distant subscriber automatically.

An additional object of this invention is to provide a repertory caller that effectively compresses, with respect to time, informations recorded therein so that the time required for automatically placing a call by means of such repertory caller is substantially less than that normally required for dialing such calling informations manually by means of a conventional telephone set.

Another object of the present invention is to provide a repertory caller which not only is capable of recording dialing or calling informations, including, for example, digital pulses or multifrequency signals, but also is capable of recording voice or audio signals, whereby such recorded audio signals may be utilized, in response to an incoming call or ringing signal, to provide an automatic answering capability.

One type of equipment illustrating certain features of the present invention may comprise several structural elements in combination with telephone apparatus including a number and/or letter dialing mechanism and a transmitter. These elements include magnetizable storage means, means selectively responsive to operation of the dialing mechanism and to voice energization of the transmitter for impressing on the storage means magnetic patterns representative respectively of a number dialed and of the voice energization, transducer means in cooperative relation with the storage means for converting the recorded magnetic patterns respectively into calling signals and into audio signals, and means for selectively applying the calling signals and the audio signals to a communication circuit.

Information storage means embodying the invention may include a magnetic belt, means for selectively advancing and retracting the magnetic belt, transducer means positioned adjacent to the magnetic belt, means upon which may be placed visible informations which are associated with calling informations, manual switching means associated with the transducer means, switching means responsive to movement of the magnetic belt, and means for moving the magnetic belt in accordance with the electrical conditions of the manual switching means and the belt-actuated switching means.

Repertory callers embodying the invention may comprise a relay switching arrangement so connected to manual switching means as to permit recording of voice signals in the repertory caller through a telephone set and enabling such caller to be responsive to incoming calls or ringing signals for the automatic transmission of signal replicas of such recorded voice signals.

One specific form of repertory caller embodying the invention may comprise a relatively wide magnetic belt, means for moving the magnetic belt longitudinally, transducer means positioned adjacent to the magnetic belt, and means for moving the transducer means laterally with respect to the belt to position the transducer means selectively with respect to successive parallel, longitudinal bands of the belt each of which may receive or carry a magnetically recorded pattern, whereby when the magnetic belt is moved longitudinally the transducer means may selectively record magnetic patterns upon and sense magnetic patterns from a predetermined one of the longitudinal bands of the belt.

When the transducer is used for sensing of magnetic patterns recorded on a magnetic band, the repertory caller generates calling signals corresponding to the sensed information and, preferably, transmits such signals over a telephone line connected between the repertory caller and a telephone exchange. Depending upon the type of magnetic patterns recorded on the sensed longitudinal band, i.e., depending upon whether the magnetic patterns represent calling information or information representative of audio signals, such transmitted signals may be used to (1) initiate a through-connection from the repretory caller to the called station by activating central office equipment at the exchange, or (2) transmit to a distant station an audio or voice signal previously recorded on the sensed longitudinal band when the distant station establishes a through-connection to the repertory caller. Alternatively, if the transducer means is utilized to record dialing information magnetically upon a selected longitudinal memory band of the magnetic belt, a signal is applied to the transducer means which corresponds to the closures of a dial-pulsing contact of the dialing mechanism.

In the repertory caller there is also provided an endless index belt which can be moved independently of the magnetic belt. The index belt includes a plurality of transverse index strips upon each of which may be recorded visible information, such as the name and telephone designation of an often-called subscriber. Further, there is provided a shaft which may be rotated to control the transverse displacement of the transducer means, as well as the rotational movement of the index belt. This shaft is so arranged as to provide means for positioning any of the transverse index strips in a location for the writing of visible information on the positioned index strip and at the same time for so positioning an index strip and the transducer means as to permit calling or audio information to be recorded magnetically in the memory band on the magnetic belt which is then adjacent to the transducer means, whereby the information recorded on such memory band has a definite association with the last-mentioned index strip.

In previously proposed arrangements to store calling information magnetically, a single heavy pulse corresponding to each direct-current impulse of a mechanical dial was impressed on the transducer to form magnetic patterns on drums or tapes. Failure of a transducer to pick up, or to read, this pulse due to lack of amplitude, or improper positioning of the pulse in time, resulted in calling errors.

In accordance with an important feature of the present invention, dialing impulses or digit signals are impressed on the magnetic recording medium as a series of alternating-current waveforms. For example, if a 500-cycle oscillator were used, each dial pulse would be represented on the recording medium by a group of approximately 30 wave shapes. When this group is read back by suitable pick-up means during subsequent operation, the output pulses are amplified, rectified and filtered to present a relatively smooth output or calling signals to operate a dialing relay. In that case, no adverse effect would result from failure of the equipment to read a few pulses, because, for example, of mechanical or other damage to the magnetic recording medium. Thus, the accuracy of dialing is greatly improved.

A complete understanding of the invention may be obtained from the following detailed description of apparatus forming specifice embodiments thereof, when read in conjunction with the appended drawings, in which:

FIG. 6 is a fragmentary perspective view of the storage assembly;

Figure 1:
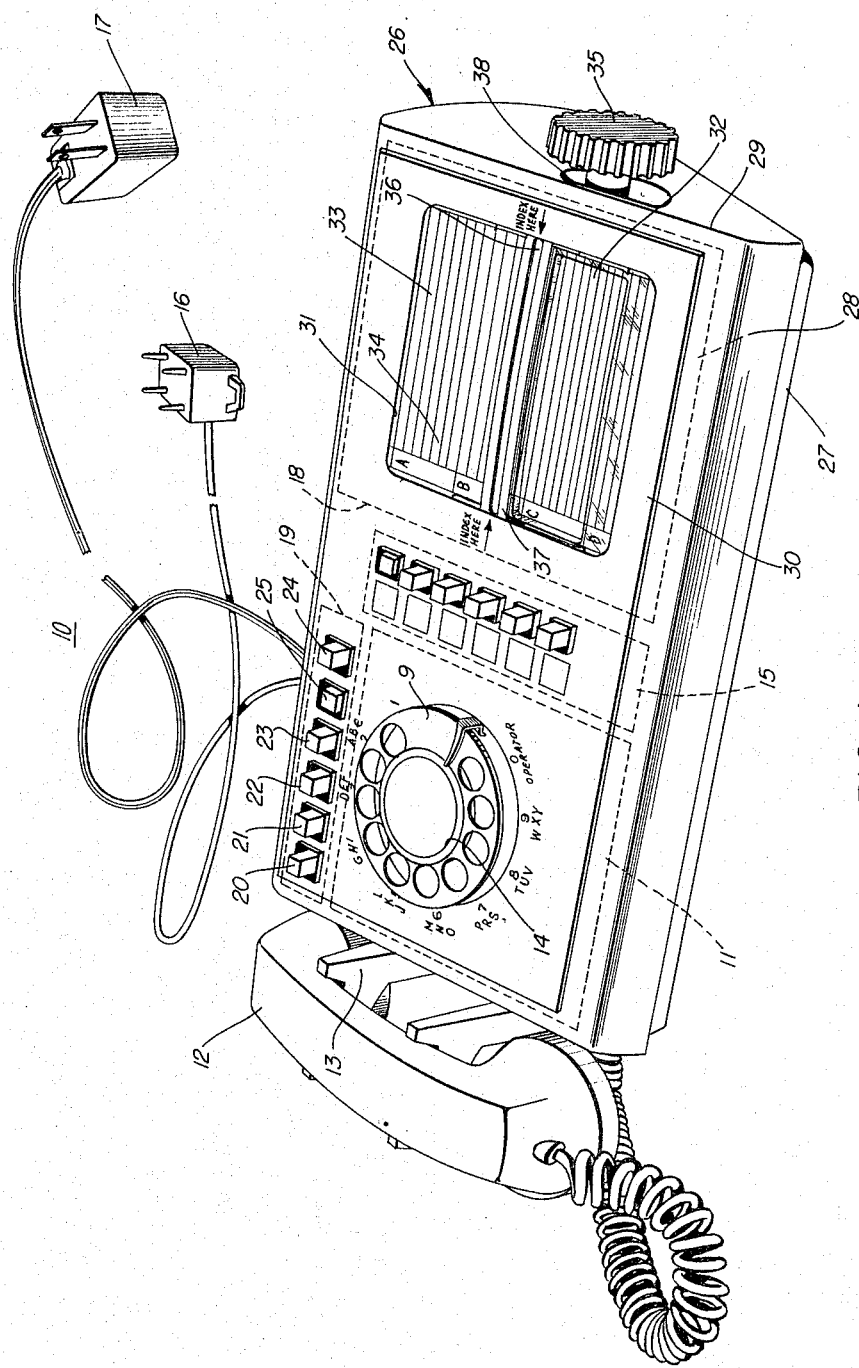
FIG. 1 is a perspective view of a repertory caller embodying the invention.
Figure 17:
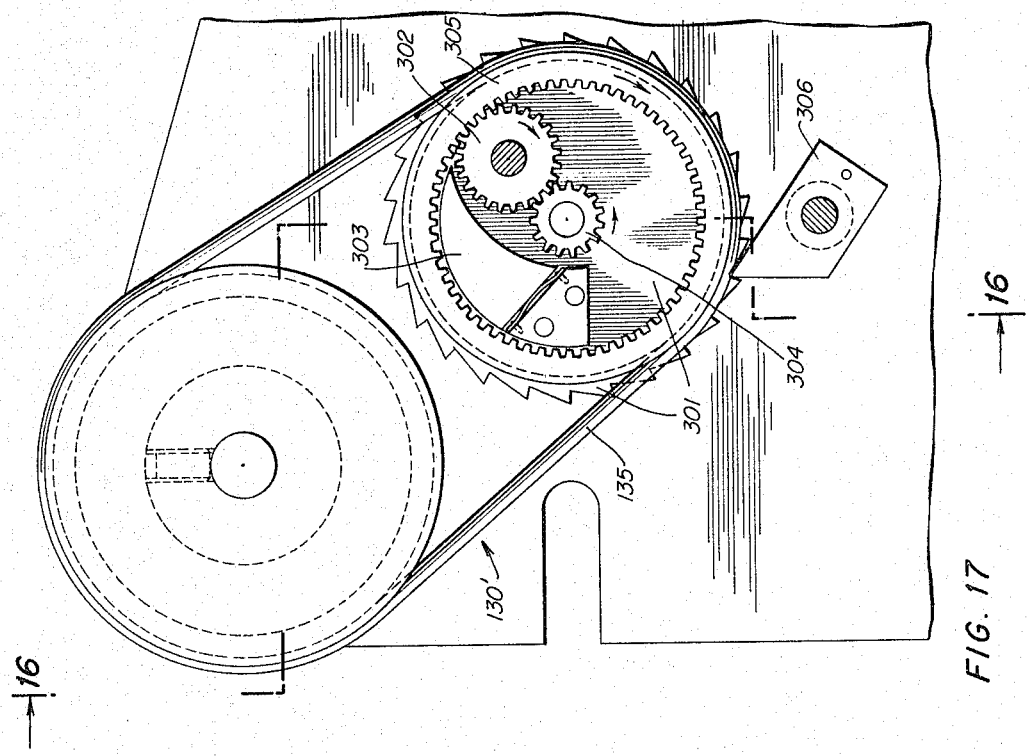
Figure 16:
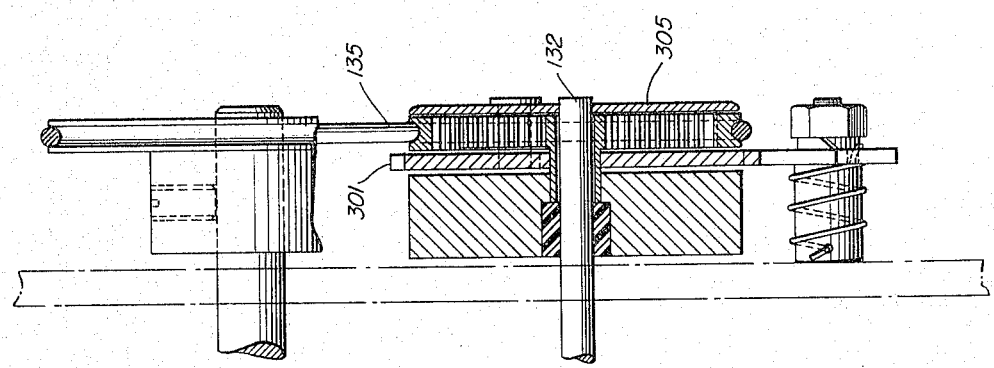

FIGS. 11 and 12, in combination, comprise a schematic wiring diagram of the circuit arrangement of the repertory caller shown in FIG. 1, including, for simplification, block representations for previously known portions thereof;

FIGS. 13, 14 and 15 depict, from different viewpoints, an alternative record-erase block portion of a record-erase assembly forming a part of the storage assembly; and FIGS. 16 and 17 are, respectively, front and side elevations of an alternative drive arrangement for the storage assembly.

GENERAL DESCRIPTION

A brief description of the major components of an illustrative embodiment of the present invention and the general manner in which they operate will be given before the structural features and electrical circuitry thereof are explained in detail.

Referring to FIG. 1, there is depicted a repertory caller designated generally by the numeral 10. The repertory caller 10 includes a telephone set 11 comprising a telephone handset 12, a handset cradle 13, a line connector 16, and a transformer-adapter 17 connectable to a power source. The necessary elements of the telephone set may be standard parts of a Western Electric code 600 set, including a conventional dialing mechanism 14 having a finger wheel 9, and a key assembly 15. The repertory caller 10 also includes an information storage assembly 18, and a key assembly 19 comprising switch assemblies 20–24 (designated hereinafter "Voice Record," "Auto Answer," "Restore," "Dial Record" and "Auto Dial," respectively) and a signal lamp 25. The repertory caller 10 includes a housing assembly 26 in which are positioned the dialing mechanism 14, key assemblies 15 and 19, respectively, and a major portion of the information storage assembly 18.

As depicted in FIG. 1, the information storage assembly 18 includes an endles index belt 33 comprising a plurality of transverse index strips 34 upon which legible information may be inscribed. The storage assembly 18 includes a positioning mechanism 35 coupled to the index belt 33 for moving the belt 33. The positioning mechanism 35 may be actuated to locate one of the index strips 34 selectively within a slot 36 formed in an index member 37 positioned fixedly above the index belt 33.

The housing assembly 26 comprises a base plate 27 and a cover assembly 28, the latter including a cover 29 having a face plate 30 positioned thereon. The cover 29 and the face plate 30 each have an aperture therethrough for enabling portions of the dial mechanism 14 and the switches of the key assemblies 15 and 19 to protrude through the housing assembly 26. The cover 29 has a window 31 formed therein to expose that portion of the index belt 33 which is in the vicinity of the index member 37. At least that part of the face plate 30 which is adjacent to the window 31 is transparent in order that the index belt 33 may be observed therethrough and through the window 31. The face plate 30 is provided with an opening 32 located directly above a portion of the window 31 of the cover 29. The opening 32 provides direct access to that portion of the index belt 33 positioned below opening 32, thus permitting a user of the repertory caller to inscribe visible information upon the exposed portion of index belt 33. A hole 38 is provided in the cover 29 at the right-hand end of housing assembly 26, as viewed in FIG. 1, through which the positioning mechanism 35 extends.

Dial Record

To record calling information in the form of magnetic patterns in the storage assembly 18, the positioning mechanism 35 is actuated, for example, by hand, so as to move the index belt 33 until one of the index strips 34 having no information written thereon or one form which information is to be erased is brought within the opening 32. This index strip 34 is then associated with, for example, a subscriber frequently called by writing onto such index strip 34 through the opening 32, suitable subscriber-identifying information, for example, the name and preferably the telephone number of the subscriber. The positioning mechanism 35 is then rotated until such inscribed strip 34 comes within slot 36 of the index member 37.

The switch assembly 23 (designated "Dial Record") is fully depressed, and the finger wheel 9 of the dial mechanism 14 is manipulated to record calling information (i.e., a subscriber's telephone number) magnetically in the storage assembly 18 while previously recorded information is erased automatically.

Generally, a telephone dialing mechanism of conventional design provides dialing pulses only when its finger wheel is returning from a wound position to its normal rest position. More specifically, a conventional dialing mechanism, such as the dialing mechanism 14, does not generate calling information as it is being rotated in a clockwise direction from its normal rest position, but does generate such information during its full spring-activated return rotation in a counterclockwise direction. In general, therefore, the resultant signals corresponding to the digits of a number are randomly and relatively widely spaced.

The repertory caller 10 needs far less time to initiate a call, when placed in its "Auto Dial" condition, than is required for manually dialing, for example, by means of a finger wheel. The reason for this is that, in accordance with the present invention, the storage assembly 18 is activated only while the finger wheel is off its normal or rest position. No magnetic patterns are stored in the storage assembly 18 during the clockwise or "wind up" rotation of the finger wheel. Magnetic patterns are stored in the storage assembly 18 corresponding to each digit as the dial returns successively to its normal position. These patterns are determined by the dial contact closures of the dialing mechanism 14 during the "Dial Record" operation of the repertory caller 10.

The intermittent operation of the assembly 18, which occurs during the storage of calling information, causes the successive magnetic patterns representing such information to be stored on a magnetic storage medium, such as a magnetic belt or the like, in uniformly and relatively closely spaced sequences, so that the periods between counterclockwise rotations of the dial during manual dialing are substantially eliminated when the recorded information is reproduced. It will be apparent, however, that appropriate separation between digit signals or groups of dial pulses corresponding to each digit is provided inherently, this separation being equal to the time required to move the dial manually in a clockwise direction from its rest position.

The stored magnetic patterns are continuously sensed during the "Auto Dial" operation of the repertory caller 10. Thus, the central office equipment is operated at its maximum feasible speed without the time-wasting pauses which occur while the user selects the successive digits of a telephone number to be called. Following the recording of a desired number, the "Restore" button is depressed to erase any remainder of a number previously stored at the same index position and to restore the storage assembly 18 to its initial condition.

*Auto Dial*

Once the subscriber-identifying information has been inscribed on the index slot 34 and the calling information associated therewith has been recorded magnetically in the storage assembly 18, a call to the subscriber associated with such information may at any time be dialed automatically by preconditioning the repertory caller 10 in the following manner:

If the inscribed index strip 34 is not beneath the slot 36 of index member 37, the positioning mechanism 35 is rotated in the necessary direction until the inscribed index strip 34 is positioned beneath the slot 36. Removal of the handset 12 from the cradle 13 and depression of the button of the "Auto Dial" switch assembly 24 will cause the repertory caller 10 to generate the desired signal replica or calling signals for initiating a call to the distant subscriber.

A convenient feature of the repertory caller 10 is that, once calling information has been recorded magnetically in the storage assembly 18, it may be maintained in such condition until a call is to be initiated. When a call is to be initiated, the positioning mechanism 35 is rotated to place any one of the inscribed index strips 34 within the slot 36 and the handset 12 is removed from its cradle 13. The user then immediately initiate the call by depressing the button of the "Auto Dial" switch assembly 24.

*Voice Record*

To record magnetic patterns in the information storage assembly 18 to provide automatic answering capability, the positioning mechanism 35 is rotated so as to bring beneath the slot 35 a transverse index strip 34 on which is inscribed the designation "Automatic Answer Message." Once such index strip 34 is so positioned, the handset 12 is removed from the cradle 13 and the number "2" is dialed to silence the dial tone. The key of the "Voice Record" switch assembly 20 is fully depressed momentarily and then allowed to assume an intermediary position. A voice or audio signal is applied by talking into the transmitter of the handset 12, which signal is recorded magnetically in the storage assembly 18. The signal lamp 25 first blinks and then is extinguished at the end of the recording period. The maximum duration of the stored voice signal is dependent upon the capacity of the storage assembly 18, the speed at which the components of the assembly 18 are rotated, and the signal fidelity desired.

*Check Voice Record*

To ascertain the quality and context of the voice signal thus recorded in the storage assembly 18, the strip 34 on which the notation "Automatic Answer Message" has been inscribed is first brought beneath the slot 36 by means of the positioning mechanism 35. Then the handset 12 is removed from the cradle 13, the number "2" is dialed and the key of the "Auto Answer" switch assembly 21 is depressed to achieve a playback of the stored voice signal.

*Auto Answer*

Once an audio signal has been recorded in the storage assembly 18, the repertory caller 10 is placed in its "Auto Answer" condition by locating the "Automatic Answer Message" strip 34 beneath the slot 36 and depressing the "Auto Answer" switch assembly 23. In such condition, the repertory caller 10, with the handset 12 positioned on its cradle 13, will transmit a replica of the previously recorded voice signal in response to any incoming call or ringing signal.

STRUCTURE

Referring to FIGS. 2–9, the storage assembly 18 comprises a pair of symmetrically related support plates 38 and 39, a frame assembly 40, a drive roller assembly 60, a pair of passive roller assemblies 70 and 80 extending between corresponding corner portions of support plates 38 and 39, a belt-tensioning roller assembly 90 (FIG. 2), and a record-erase assembly 100. Positioned about the roller assemblies 60, 70 and 80 are endless magnetic belt 120 and the endless index belt 33, the latter surrounding the former but being movable independently thereof.

The frame assembly 40 (FIG. 7) comprises a plurality of plates 41, 42, 43 and 44, at least three of which are fixedly connected to each other. Located within the frame assembly 40 and extending between the plates 41 and 43 are a pair of multicontact receptacles 45 and 46. Extending longitudinally and in alignment with the receptacles 45 and 46 are a plurality of channels 47, 48, 49 and 50. Positioned by the channels 47–50 are a pair of printed circuit boards 51 and 52 (FIG. 5) having a pair of multicontact plugs (not shown) which engage the receptacles 45 and 46.

The frame assembly 40 is attached fixedly to the plates 38 and 39 to hold the side plates 38 and 39 in alignment with each other and at a fixed distance apart. An aperture 55 (FIG. 5) of the same general cross-sectional configuration as that defined by the inner surfaces of the plates 41–44 is provided in the plate 39 for enabling the passage therethrough of the printed circuit boards 51 and 52.

The drive roller assembly 60 comprises a cylinder 61 (FIG. 4) having a belt-guide flange 62, a stud shaft 64 (FIG. 8) extending axially into the cylinder, a belt-guide flange 63 positioned within an axial recess 66 in the cylinder 61, and a pin-end shaft 67 positioned concentrically within the flange 63. The flange 63 and the pin-end shaft 67 are so constructed that, upon the insertion of the shaft axially into the flange, the flange is forced to expand into engagement with that portion of cylinder 61 defining the recess 66. Due to such engagement, the cylinder 61 holds the flange 63 at a selected position along the longitudinal axis of the cylinder 61. To permit rotational movement of the drive roller assembly 60, the stud shaft 64 and the pin-shaft 67 are positioned within a pair of roller bearings (not shown) located within the side plates 38 and 39.

To cause rotation of the drive roller assembly 60, there is provided a drive arrangement 130 (FIG. 9) comprising a drive motor 131 (FIG. 4) positioned fixedly within the frame assembly 40, and having a drive shaft 132 extending out through the support plate 38. A flywheel 133 is positioned about the drive shaft 132, and a pulley 134 is positioned concentrically about the stud shaft 64. A drive belt 135 couples the drive shaft 132 to the pulley 134, thus coupling motor 131 mechanically to the assembly 60. The flywheel 133 includes a resilient sleeve 136 (FIG. 9) made, for example, of gum rubber, positioned about the drive shaft 132. The sleeve 136 and the drive belt 135 function to dampen speed and torque fluctuations, and to prevent metal-to-metal contact, thus reducing noise. The belt drive 135 is resilient enough to dampen noise but has sufficient rigidity to provide a positive drive between the flywheel 133 and the pulley 134.

Positioned parallel to the drive roller assembly 60 are the passive roller assemblies 70 and 80 (FIGS. 2 and 4), comprising respectively shafts 71 and 81, pluralities of rollers 72 and 82, and pluralities of spacing collars 73 and 83. The shafts 71 and 81 extend axially through roller bearings (not shown) located within side plates 38 and 39.

Figure 2:
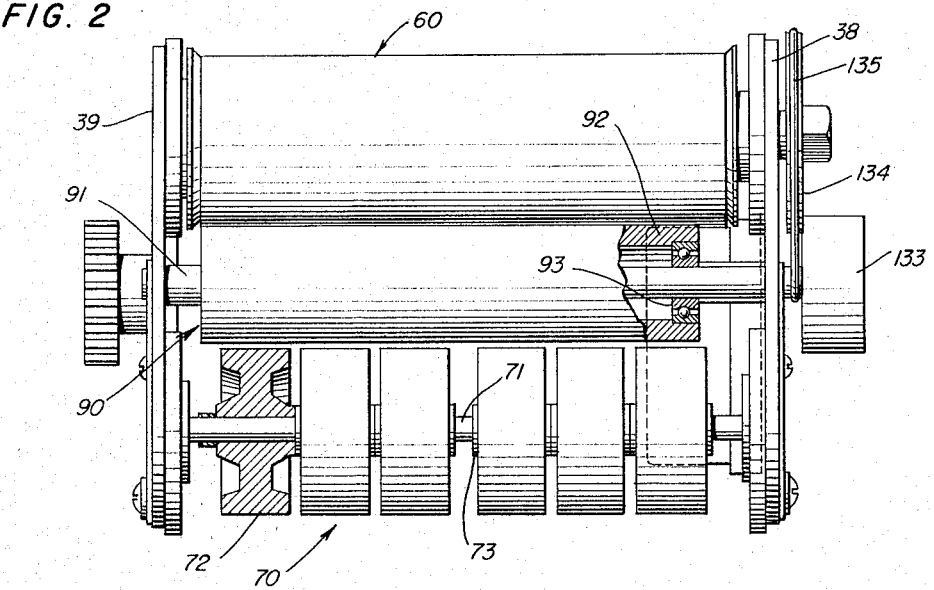
FIGS. 2, 3 and 5 are, respectively, rear, left-side and right-side elevations of an information storage assembly included in the repertory caller shown in FIG. 1.
Figure 3:
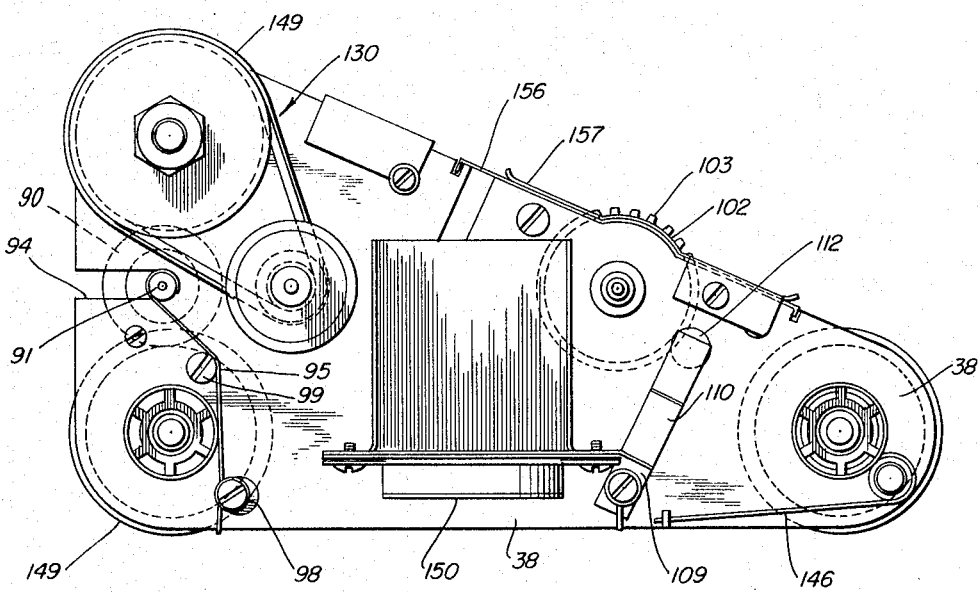
Figure 4:
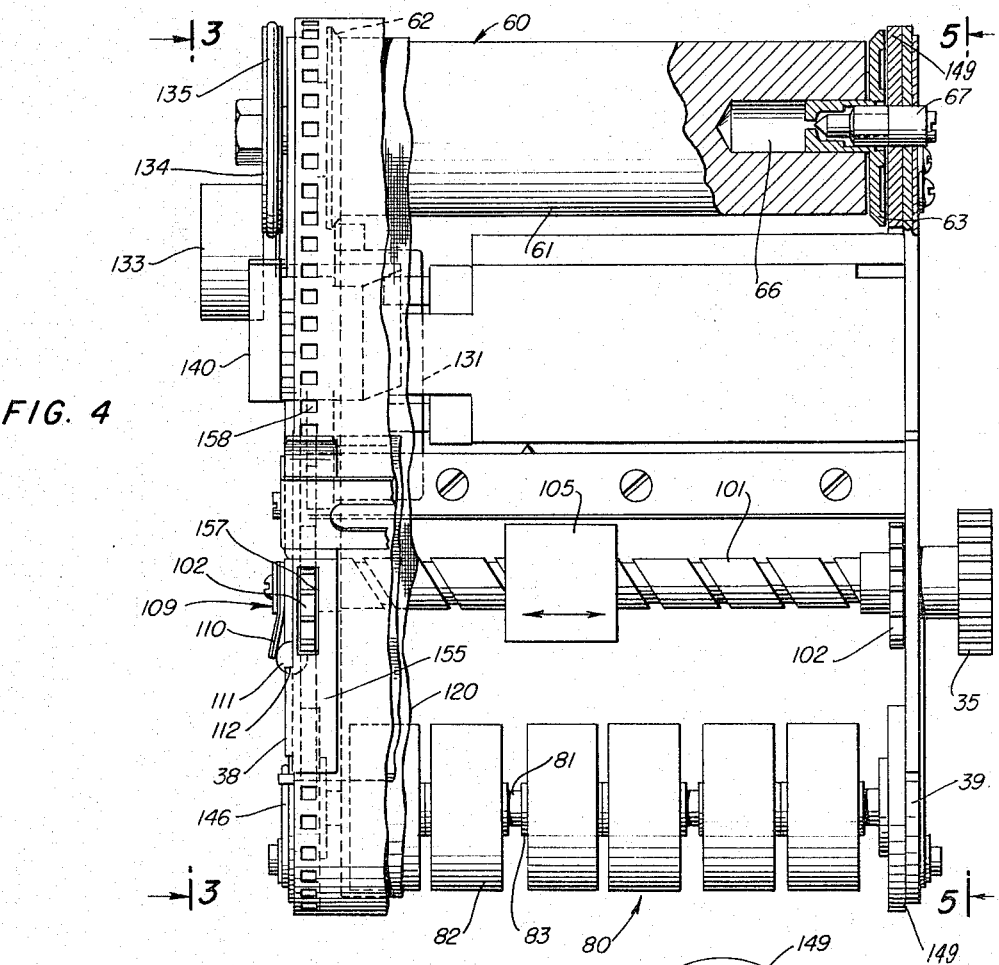
FIG. 4 is a partially cut-away, top plan view of the information storage assembly.
Figure 5:
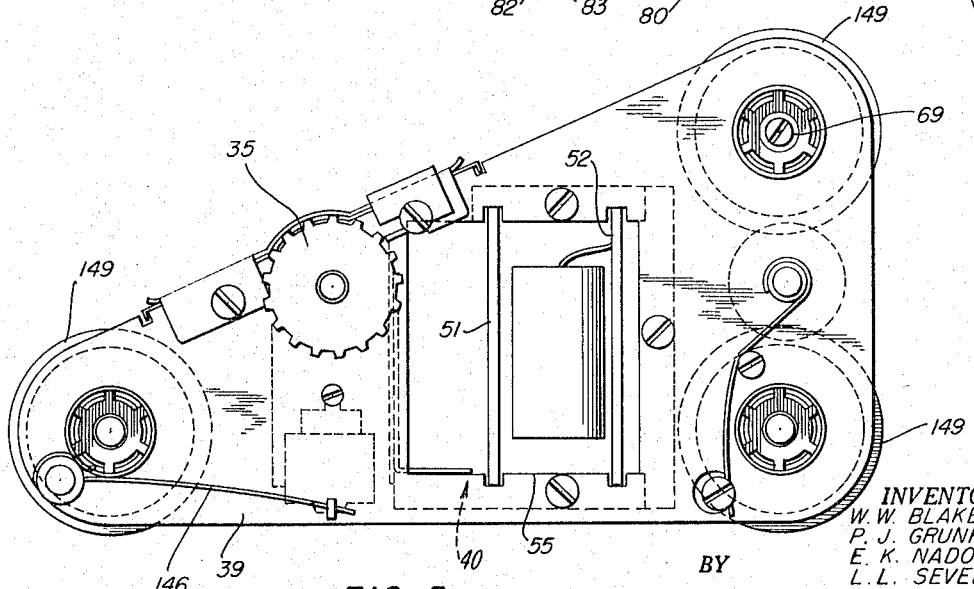
Figure 7:
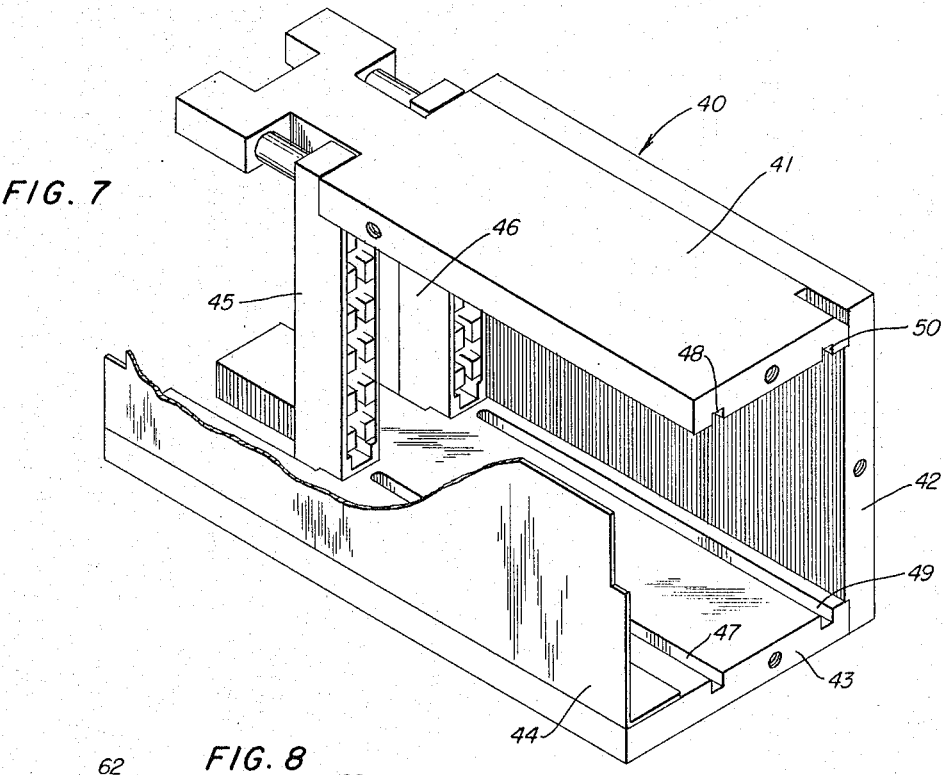
FIG. 7 is a perspective view of a strut assembly included in the storage assembly.
Figure 8:
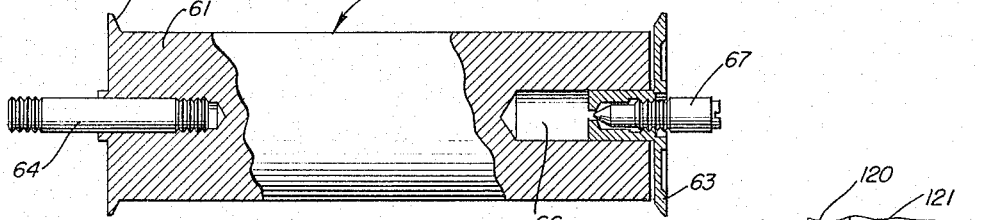
FIG. 8 is a side elevation of a drive roller of the type included in the storage assembly, with portions thereof broken away.
Figure 9:
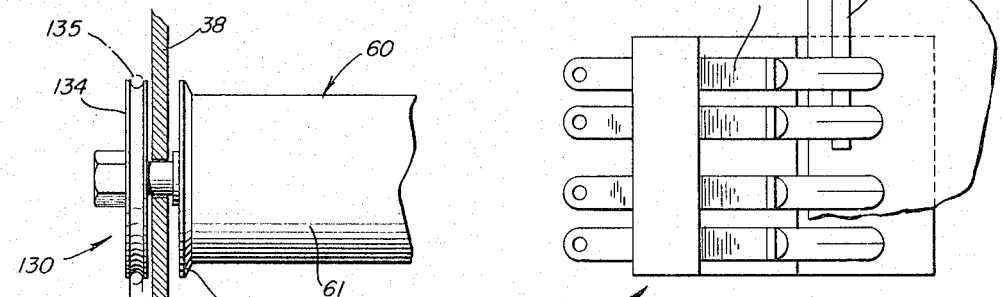
FIG. 9 is a side elevation of the roller drive arrangement included in the storage assembly, with portions thereof broken away.

Positioned between and extending parallel to the roller assemblies 60 and 70 is a belt-tensioning roller assembly 90 (FIG. 2). The assembly 90 comprises a shaft 91, a cylinder 92 positioned about the shaft 91, and a pair of ball-bearing mountings 93 positioned between the shaft 91 and the cylinder 92 so as to permit rotation of the latter about the former. The end portions of the shaft 91 extend through a pair of slots 94 (FIG. 3) formed in the side support plates 38 and 39.

There are further provided a pair of springs 95 connected to the side plates 38 and 39, which apply forces to urge the shaft 91 into the slots 94. Each of the springs 95 is fastened to a member 98 extending out from one of the side plates 38 and 39, and rests against a post 99 attached to one of the plates 38 and 39 and located between but not in alignment with the member 98 and one of the slots 94. Springs 95 extend from fastening members 98 over the posts 90 and partially encircle the end portion of the shaft 91.

To maintain the magnetic belt 120 (FIG. 4) in a taut condition about the cylinder 61 and the rollers 72 and 82, the magnetic belt is positioned beneath the assembly 90 and over the assemblies 60 and 70. The length of the magnetic belt 120 is such that the belt restrains the movement of the belt-tensioning roller assembly 90 into the slots 94 (i.e., counteracts the forces applied to the shaft 91 by the springs 95). Consequently, the magnetic belt 120 is maintained in taut condition. The magnetic belt 120 is acted upon further by a pressure pad 145 (FIG. 6) extending between the support plates 38 and 39 in the immediate vicinity of a record-erase head 104 included in a record-erase assembly 100. Two springs 146 are attached to the support plates 38 and 39 and to the pad 145 so as to force the pad against the magnetic belt 120, and in turn to force the magnetic belt against the record-erase head 104.

The record-erase assembly 100 comprises a threaded shaft 101 actuated by the positioning mechanism 35, a stabilizing rod 106. The shaft 101 and the rod 106 extend parallel to the roller assemblies 60, 70 and 80. The end portions of the threaded shaft 101 are supported by the support plates 38 and 39 in a manner permitting rotational movement of the shaft 101. Sprocket wheels 102 are provided with sprockets 103 and are fixedly attached about the shaft 101 in the vicinity of the side plates 38 and 39.

A record-erase block 105, which includes a record-erase head 104, is supported by and positioned about the threaded shaft 101. The block 105 includes a threaded sleeve 107 positioned concentrically about and in mesh relation with the threaded shaft 101. Further, the block 105 includes a passage 108 through which the stabilizing rod 106 extends. To prevent the record-erase block 105 from rotating with the threaded shaft 101 as the positioning mechanism 35 is rotated, the stabilizing rod 106 is fixedly attached to the side plates 38 and 39. The mesh relation between the threaded shaft 101 and the threaded sleeve 107 causes the block 105 to move axially along the shaft 101 upon the rotation of the latter shaft.

Step-by-step rotational movement of the shaft 101 is insured by a detent assembly 109 comprising a pressure spring 110 and a sphere 111 (FIG. 4) positioned within an aperture 112 in the plate 38. The spring 110 is attached to the side plate 38 and applies a force against the sphere 111. The aperture 112 is of sufficient diameter to permit the sphere 111 to move laterally in accordance with the forces applied thereto by the spring 110 and the sprockets 103 of the wheel 102.

Figure 10:
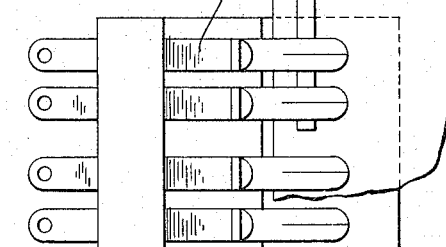
FIG. 10 is a top plan view of a switching assembly comprising a portion of the storage asembly.

A switch assembly 140 (FIG. 10) comprising a plurality of spring contacts 141, between which a portion of the magnetic belt 120 extends, is fixedly attached to the support plate 38 adjacent to one side of the magnetic belt 120. The portion of magnetic belt 120 which passes between the spring contacts 141 includes a superimposed longitudinal strip 121. The strip 121 preferably is serrated for flexibility and is of such thickness and length as to actuate the spring contacts 141 in a programmed manner as belt 120 is moved.

To enable plug-in replacement of the storage assembly 18, there is provided a multicontact plug (FIG. 3) attached to the support plate 38. The multicontact plug 150 is connected electrically to the various components of the storage assembly 18 (viz., the switching assembly 140 drive motor 131, and record-erase head 104). A multicontact receptacle (not shown), connected to all the various components of the repertory caller 10 except than those of storage assembly 18, is attached to the base plate 27 of the housing 26 and engages the plug 150, thus providing electrical continuity between the various components of the repertory caller 10.

To provide separation between the magnetic belt 120 and the index belt 33, with the latter circumscribing the former, there are provided a plurality of discs 149 (FIGS. 4 and 5), pairs of which are concentrically related to rotor assemblies 60, 70 and 80. The discs 149 have diameters greater than those of the belt-guide flanges 62 and 63, and the rollers 72 and 82, and extend beyond the corner portions of the support plates 38 and 39. Consequently, the discs 149 support the index belt 33 and provide a separation between the belts 33 and 120 so that either of the belts may be moved independently of the other. For example, the index belt 33 may be rotated by means of the positioning mechanism 35 so as to position a transverse index strip 34 selectively without affecting the magnetic belt 120. Also the magnetic belt 120 may be rotated by means of drive motor 131 without moving the index belt 33.

To enable visible information to be inscribed on an index strip 34 through the opening 32 without interfering with that portion of the magnetic belt 120 lying below such opening, a plate 156 (FIG. 6) is secured to the support plates 38 and 39 and extends between the belts 120 and 33. The plate 156 has a pair of apertures 157 (FIG. 4) formed therein through which the sprockets 103 extend so as to engage a plurality of sprocket holes 158 located along the opposite edges of the index belt 33. There are also provided a pair of side pressure plates 155 (FIGS. 4 and 6) attached to the support plates 38 and 39, respectively, and extending over the index belt 33. Each of the pressure plates 155 has an aperture 160 through which protrude the sprockets 103 of one of the sprocket wheels 102 to permit the sprockets to enter the sprocket holes 158.

From the foregoing description of the various components of the information storage assembly 18, it should be apparent that, when the positioning mechanism 35 is rotated in either direction, the threaded shaft 101 and the sprocket wheels 102 thereon will cause two simultaneous interrelated operations. More specifically, the threaded shaft 101 will rotate so as to move the record-erase block 105 transversely across the index belt 33 (the speed and direction of the block's movement being determined by the relation between the threaded shaft 101 and the threaded sleeve 107), at the same time, the sprocket wheels 102 will move the index belt 33 in the direction of the wheel rotation so as to permit selective positioning of any of the transverse index strips 34 within the window 31 or beneath the slot 36 of the index member 37. Consequently, since the movements of the block 105 and the index belt 33 are simultaneous, but different in direction (i.e., one is rotational, the other lineal), there is, for each of the transverse index strips 34, an associated distinct transverse position of the record-erase block 105. Also, the magnetic belt 120 may be rotated by the drive roller assembly 60 without affecting the index belt 33 or the transverse position of the record-erase block 105. Consequently, there is, for each index strip 34, a corresponding narrow, longitudinal signal band on the magnetic belt 120 along which signals relating to its corresponding index strip can be recorded or erased magnetically.

ELECTRICAL CIRCUIT

The circuit details of the repertory caller 10 are shown schematically in FIGS. 11 and 12. A clear understanding of the functioning of the circuit may be obtained by considering each of its operating sequences (viz., Dial Record, Auto Dial, Voice Record and Auto Answer), with special attention being given to the conditions of the various circuit elements at any given instant.

FIGS. 11 and 12 depict the circuit elements of repertory caller 10 in their normal rest, or inoperative conditions, i.e., the conditions the various elements assume prior to the application thereto of any mechanical force or electrical signal. To indicate the specific condition of the various circuit elements during the operation of the repertory caller 10, the designations "(n.o.)" and "(op.)" will be used. The abbreviation "(n.o.)" indicates that the element referred to is in its normal rest or non-operating, condition; while the abbreviation "(op.)" indicates that the element referred to has been activated or is in operating condition.

Assuming that it is desired to record dialing information, the positioning mechanism 35 is rotated so as to move the index belt 33 until a selected index strip 34 is brought within the opening 32, thus enabling subscriber-identifying information to be inscribed on the selected strip.

Following each "Auto Dial" operation, the magnetic belt 120 is brought automatically to its zero rest position by the application of an A.C. potential to the drive motor 131 and the signal lamp 25. Such potential is applied by means of the transformer-adapter 17, an "Auto Dial" switch 24–1 (n.o.) of the "Auto Dial" switch assembly 24, a "Dial Record" switch 23–1 of the "Dial Record" switch assembly 23, a switch 140–2 (n.o.) of the switch assembly 140, and a ringer relay contact 201 (n.o.) of a ringer relay 202. The switch 140–2 (op.) is rendered operational by a strip 121 (FIG. 10) when the magnetic belt 120 is at its rest position. In its inoperative condition, the switch 140–2 (n.o.) connects the "Dial Record" switch 23–1 (n.o.) to the ringer relay contact 201 (n.o.) so as to apply an A.C. potential to the drive motor 131.

Dial Record

When the key of the "Dial Record" switch assembly 23 is depressed, A.C. potential is applied through the "Auto Dial" switch 24–1 (n.o.) and the "Dial Record" switch 23–1 (op.) to a power supply terminal H of an oscillator 204 attached to the printed circuit board 51. Preferably, the oscillator 204 is arranged to oscillate at 500 cycles per second. A pair of ouput terminals C and E of the oscillator 204 are connected through a pair of "Dial Record" switches 23–2 (op.) and 23–3 (op.) to a read and record element 206 of the magnetic head 104. In addition, the output terminal C of the oscillator 204 is connected to an input terminal A of an amplifier 231 attached to the printed circuit board 52 by means of "Dial Record" switches 23–2 (op.) and 23–3 (op.), and a "Voice Record" switch 20–2 (n.o.) of the "Voice Record" switch assembly 20. During the time the key of the "Dial Record" switch assembly 23 is depressed, a power supply input termial H of the amplifier 231 is not connected to the A.C. potential source 250 because the "Dial Record" switch 23–4 (op.) is in its operational condition. At this time, the read and record element 206 of the magnetic head 104 is short-circuited by a conductive path comprising a "Dial Record" switch 23–6 (op.), a pulsing relay contact 209 (n.o.), a dial pulsing conttct 211 (n.o.) and the "Dial Record" switch 23–3 (op.). The "Dial Record" switch 23–2 (op.) is connected to the base of the repertory caller 10 as is the read and record element 206.

When the finger wheel 9 of the dial mechanism 14 is rotated clockwise from its rest position in order to record a particular letter or digit, a dial off normal contact 213 (op.) assumes a closed condition until the wheel returns counterclockwise to its unwound rest position. During the period while the finger wheel 9 is returning to its rest position, and A.C. potential is applied through the "Auto Dial" switch 24–1 (n.o.), the "Dial Record" switch 23–1 (op.), and the dial off normal contact 213 (op.) to an input terminal K of an erase power supply 207 attached to the printed circuit board 51.

Simultaneously, an A.C. potential is applied to the drive motor 131 and to the signal lamp 25 by way of the "Dial Record" switch 23–4 (op.) connected to the dial off normal contact 213 (op.) and the ringer relay contact 201 (n.o.) connected to the parallel combination comprising the drive motor and the signal lamp. Consequently, since an erase element 208 of the magnetic head 104 is connected to an output terminal L of the erase power supply 207, and since at this time the drive motor 131 is energized so as to rotate the magnetic belt 120, the portion of the magnetic belt 120 immediately adjacent to the erase element 208 of the magnetic head 104 is cleared of all magnetic patterns recorded thereon previously.

Concurrently, an output terminal E of the oscillator 204 is connected to the read and record element 206 of the magnetic head 104, so that information is recorded magnetically upon that portion of the magnetic belt 120 immediaely adjacent to the read and record element 206. As the wheel 9 of the dial mechanism 14 is released from a wound position and starts to return to its normal rest position, the dial pulsing contact 211 opens and closes, thus alternately applying and removing the short circuit of the oscillatory signals of the oscillator 204. Consequently, for each digit dialed, there is a group of pulses equal in number to the dialed digit, each of which is a continuous wave pulse of the oscillatory signals of the intermittently short-circuited oscillator 204 and each of which is recorded on the magnetic belt 120.

The longitudinal strip 121 is so positioned on the magnetic belt 120 that approximately ½ second after the counterclockwisse return motion of the wheel 9 has been initiated, a conductive path is completed between the potential source 250 and the motor-lamp combination 131–25 previously described under this subtitle. This path comprises the "Auto Dial" switch 24–1 (n.o.), the "Dial Record" switch 23–1 (op.), the "Dial Record" switch 23–5 (op.), and a pair of switches 140–1 (op) and 140–4 (op.), both of which are rendered operative at this time by the strip 121. After the wheel 9 has returned to its normal rest position, the dial off normal contact 213 (n.o.) assumes an open condition, thus opening the first-mentioned conductive path to the motor-lamp combination 131–25, which at this time is energized by way of the second-described conductive path. The A.C. potential is applied at this time to an input terminal K of the erase power supply 207 from one side of the ringer relay contact 201 (n.o.) through the "Dial Record" switch 23–4 (op.).

For a short period after the wheel 9 has reached its rest position, the drive motor 131, which is energized through the second-described conductive path, continues to rotate the magnetic belt 120, the erase element 208 of the magnetic head 104 continues to erase magnetic patterns that may have been recorded previously on the belt 120, and the read and record element 206 of the magnetic head 104 is energized from the terminal E of the oscillator 204. Approximately 2¼ seconds after the initiation of the clockwise motion of the finger wheel 9, the switch 140–1 (n.o.) is made inoperative by the strip 121. Consequently, A.C. potential is no longer applied to the motor-lamp combination 131–25, or to the input terminal K of the erase power supply 207. This circuit permits dialing an initial number "9" when calling through a PBX requiring a second dial tone. If the "Auto Dial" switch 24 is held depressed, the initial number "9" is dialed and the machine stops. When the second dial tone is heard, the "Auto Dial" switch is released and the machine continues to dial the balance of the number.

At this time the recording of information representing a first digit is completed and magnetic patterns representing a second digit may be recorded on the magnetic belt 120 by rotating the finger wheel 9 clockwise from its normal rest position in the conventional dialing manner. This motion causes the dial off normal contact 213 (op.) to again close, thus applying A.C. potential through the "Auto Dial" switch 24–1 (n.o.), the "Dial Record" switch 23–1 (op.) and the dial off normal contact 213 (op.) to the input terminal K of the erase power supply 207 and, also, through the "Dial Record" switch 23–4 (op.) and the ringer relay contact 201 (n.o.) to the motor-lamp combination 131–25. Consequently, the energized drive motor 131 rotates the magnetic belt 120, and the erase element 208 which is connected to an output terminal L of the erase power supply 207, removes any previously recorded magnetic patterns from that portion of the magnetic belt 120 adjacent to the erase element 208.

Concurrently, the read and record element 206 of the magnetic head 104 which is connected to the output terminal E of the oscillator 204, is energized by the oscillatory signals of such oscillator. When the finger wheel 9 is released from its wound position and commences to return counterclockwise towards its rest position, the dial pulsing contact 211 opens and closes, thus alternately applying and short circuiting the oscillatory signals from the output terminal C of the oscillator 204 to the read and record element 206. Accordingly, in the same manner as previously described with regard to the dialing of a first digit, a group of pulses, equal in number to the second digit dialed, is recorded on that portion of the magnetic belt 120 advancing immediately adjacent to the magnetic head 104. When the finger wheel 9 completely unwinds to its normal rest position, the dial off normal contact 213 (n.o.) assumes an open condition, which causes the A.C. potential source 250 to be disconnected from the motor-lamp combination 131–25 and from the erase power supply 207. Each of the remaining digits of the calling information to be recorded may be recorded in the same manner.

It is to be here noted that, in accordance with the above-described procedure of recording the various digits of a dialing information (e.g., a telephone number), for each digit recorded the drive motor 131 is activated only upon the rotation of the finger wheel 9 in a clockwise direction away from its normal rest position. The drive motor 131 is deactivated when the wheel has completely returned in a counterclockwise direction to its normal rest position. Consequently, there is a start-and-stop motion of the magnetic belt 120, which causes the successive magnetic patterns recorded thereon which are representative of the successive dialing informations to be physically close to each other. As a result, subsequent continuous-speed sensing of such magnetic patterns provides a replica of the stored information compressed with respect to time.

*Restore*

To return the magnetic belt 120 to its zero rest position upon completion of "Dial Record" operation or when a digit has been recorded improperly or unintentionally, the key of the "Restore" switching assembly 22 is depressed and the mechanical coupling between the switching assemblies 20–24 causes each of the switch assemblies 20, 21, 23 and 24 (n.o.) to assume its inoperative condition. Upon such depression, the A.C. potential source 250 is connected through the "Auto Dial" switch 24–1 (n.o.), the "Dial Record" switch 23–1 (n.o.), the switch 140–2 (n.o.) and the ringer relay contact 201 (n.o.) to the motor-lamp combination 131–25 and, also, through the "Dial Record" switch 23–4 (n.o.) and the "Restore" switch assembly 22 (op.) to the terminal K of the erase power supply 207. The erase element 208 of the magnetic head 104 is energized by the erase power supply 207 so as to remove previously recorded magnetic patterns from that portion of magnetic belt 120 passing immediately adjacent to the magnetic head 104. When the magnetic belt 120 reaches its zero rest position, the switch 140–2 (n.o.) is caused to assume its operative condition by the strip 121. As a consequence, A.C. potential is disconnected from the motor-lamp combination 131–25 and from the erase power supply 207.

*Voice Record*

To record magnetic patterns of the audio or voice signals in the information storage assembly 18, the drive mechanism 35 is rotated so as to bring beneath the slot 36 of index member 37 the transverse index strip 34 designated "Automatic Answer Message." Upon such positioning, the "Voice Record" switch assembly 20 (which is of the momentary-make type) is depressed and the potential source 250 is connected through the "Voice Record" switch 20–1 (op.), the switch 140–2 (op.), and the ringer relay contact 201 (n.o.) to the motor-lamp combination 131–25. In addition, the potential source 250 is connected to the power supply terminal H of the amplifier 231 by means of the "Restore" switch 22 (n.o.) and the "Dial Record" switch 23–4 (n.o.) serially connected to one side of the ringer relay contact 201 (n.o.) The potential source 250 also is connected to the input terminal K of the erase power supply 207 by means of the "Voice Record" switch 20–2 (op.) connected to one side of the "Restore" switch 22. Accordingly, the drive motor 131 is energized so as to rotate the magnetic belt 120 from its zero rest position, while the erase element 208 of the magnetic head 104, which is connected to output terminal L of the erase power supply 207, is energized to remove any previously recorded magnetic patterns on that portion of the magnetic belt passing immediately adjacent to the head. After the drive motor 131 has been so energized for approximately ¼ of a second, the strip 121 places the switch 140–3 (op.) in its operative condition.

The key of the "Voice Record" switch assembly 20 is then released, and the "Voice Record" switch 20–1 (n.o.) assumes its inoperative condition while the "Voice Record" switch 20–2 (op.) remains latched in its operative condition. Upon such release, A.C. potential is applied to the motor-lamp combination 131–25 through "Auto Dial" switch 24–1 (n.o.), the "Dial Record" switch 23–1 (n.o.), the switch 140–3 (op.) and the ringer relay 201 (n.o.). Further, since the "Dial Record" switch 23–4 (n.o.), the "Restore" switch 22 (n.o.) and the "Voice Record" switch 20–2 (op.) are connected to the ringer relay contact 201 (n.o.), A.C. potential is applied to the input terminal K of the erase power supply 207 and to power supply terminal H of the amplifier 231. Approximately 2½ seconds after the key of the "Voice Record" switch assembly 20 is depressed, the switch 140–2 (n.o.) and the switch 140–3 (op.) form parallel conductive paths to the motor 131. Approximately 2¾ seconds after such key depression, the switch 140–3 (n.o.) is rendered inoperative by the strip 121, leaving only the switch 140–2 (n.o.) to conduct current to the drive motor 131.

Upon the removal of telephone handset 12 from its cradle 13 and the application of a voice signal to the transmitter of the handset, there is generated a voltage variation between the terminals B and R of the telephone set 11. This voltage variation is applied through a transformer 220 to the input terminal A of the amplifier 231 by way of resistor 221 and the "Voice Record" switch 20–4 (op.). The signal applied to the terminal A is amplified by the various stages of the amplifier 231. The amplified signal is then transmitted through a resistor 222 and the "Voice Record" switch 20–3 (op.) to the "Read and Record" element 206 of the magnetic head 104, whereby the amplified voice signal is recorded on that portion of the magnetic belt 120 passing immediately adjacent to the head 104. After one full revolution of the magnetic belt 120 from its zero rest position, the strip 121 renders the switch 140–2 (op.) operative, thus disconnecting the A.C. potential source 250 from the motor-lamp combination 131–25, from the erase power supply 207, and from the power supply terminal H of amplifier 231.

*Check Voice Record*

To ascertain the quality and context of an audio or voice signal recorded in the storage assembly 18, the index strip 34 marked "Automatic Answer Message" is brought within the slot 36 of index member 37, the key of the "Auto Answer" switch assembly 21 is depressed, and the handset 12 is removed from its cradle 13. The "Auto Answer" switch assembly 21, which is of the momentary-make type, comprises an "Auto Answer" switch 21–1 (op.), which remains closed only during the application of a continuous depressive force to the key of assembly 21, and an "Auto Answer" switch 21–2 (op.), which remains latched in its closed condition after the depressive force is removed from the key of the assembly 21. Upon the depression of the key of the switch assembly 21, A.C. potential is applied through the "Auto Answer" switch 21–1 (op.), the switch 140–2 (op.) and the ringer relay contact 201 to the motor-lamp combination 131–25. Also, A.C. potential is applied at this time to the power supply terminal H of the amplifier 231 by way of the "Dial Record" switch 23–4 (n.o.) connected to the ringer relay contact 201 (n.o.) and the "Restore" switch 22 (n.o.).

Approximately ¼ of a second after the key of switch assembly 21 has been initially depressed, the strip 121 activates the switch 140–3 (op.). The key of assembly 21 is then released, which causes the "Auto Answer" switch 21–1 (n.o.) to assume its normal open condition, while the "Auto Answer" switch 21–2 (op.) remains latched closed. Consequently, A.C. potential is connected to the motor-lamp combination 131–25 through the "Auto Dial" switch 24–1 (n.o.), the "Dial Record" switch 23–1 (n.o.), the switch 140–3 (op.) and the ringer relay contact 201. Further, A.C. potential is applied to the terminal H of the amplifier 231 by means of the "Restore" switch 22 (n.o.) and the "Dial Record" switch 23–4 (n.o.) connected to the ringer relay contact 201.

Approximately ¼ of a second later, the continuing rotation of the magnetic belt 120 causes the strip 121 to operate the switch 140–4 (op.) to connect the ringer relay contact 201, to which A.C. potential is being applied, to a line hold relay 225 by way of the "Auto Answer" switch 21–2 (op.). The A.C. potential applied to the line hold relay 225 closes a line hold contact 226 connected between a terminal R of a telephone line, to which the repertory caller 10 is connected, and a line amplifier 227. The continuing rotation of the magnetic belt 120 causes the strip 121 to actuate the switch 140–1 (n.o.) 2½ seconds after the belt started rotating. Thus the switches 140–1 (n.o.) and 140–3 (op.) are parallel to each other with respect to the line hold relay 225.

Approximately ¼ of a second later, the ending of the strip 121 permits the switch 140–2 (n.o.) to assume its inoperative condition; thus the switches 140–2 (n.o.) and 140–3 (op.) are parallel to each other with respect to the motor-lamp combination 131–25. Approximately ¼ of a second later, the strip 121 forces the switch 140–3 (n.o.) to its inoperative condition, leaving the switch 140–2 (n.o.) to conduct current to the drive motor 131 by way of the "Auto Dial" switch 24–1 (n.o.), the "Dial Record" switch 23–1 (n.o.), the switch 140–2 (n.o.), and the ringer relay contact 201 (n.o.). Due to the strip 121, the switch 140–4 (n.o.) assumes its inoperative condition ¼ of a second later, leaving the switch 140–1 (n.o.) to conduct current to the line hold relay 225.

As the magnetic belt 120 is rotated by the drive motor 131, the "Read and Record" element 206 of the magnetic head 104 senses any magnetic patterns previously recorded on the magnetic belt 120 and applies signals corresponding to such patterns to the input terminal A of the amplifier 231 through the "Voice Record" switch 20–4 (n.o.). Such sensed signals are amplified by the various stages of the amplifier 231 and are then conducted from the output terminal L of the amplifier 231 through the "Auto Dial" switch 24–2 (n.o.) and the transformer 220 to the line amplifier 227. Since the line amplifier 227 is connected across the terminals T and R of the telephone line, the receiver of the handset 12 translates the amplified signals into sound waves.

Approximately ¼ of a second before the completion of one complete revolution of the magnetic belt 120, the strip 121 causes the switch 140–1 (op.) to assume its operative condition, thus disconnecting the potential source 250 from the line hold relay 225 (n.o.). As a consequence, the line hold contact 226 (n.o.) opens and the line amplifier 227 is disconnected from the line terminal R. After one complete revolution of the magnetic belt 120, the strip 121 causes the switch 140–2 (op.) to become operative, whereupon the potential source 250 is disconnected from the motor-lamp combination 131–25 and from the terminal H of the amplifier 231. At this time, the magnetic belt 120 remains at its zero rest position and the sequence of steps followed to ascertain the quality and context of a previously recorded voice signal is completed.

*Auto Dial*

Once the subscriber-identifying information has been inscribed on an index strip 34 and the calling information associated therewith has been recorded magnetically in storage assembly 18, a call to the subscriber associated with such information may be initiated automatically at any time by means of the repertory caller 10 by placing that inscribed index strip 34 within the slot 36 of the index member 37, removing the handset 12 from its cradle 13, and depressing the key of the "Auto Dial" switch assembly 24.

The depression of the key of the "Auto Dial" switch assembly 24, which is of the momentary-make type, causes an A.C. potential to be applied through the "Auto Dial" switch 24–1 (op.), the switch 140–2 (op.) and the ringer relay contact 201 to the motor lamp combination 131–25, and through the "Dial Record" switch 23–4 (n.o.) and the "Restore" switch 22 (n.o.) to the power supply terminal H of the amplifier 231. Consequently, the drive motor 131 rotates the magnetic belt 120 and the read and record element 206 of the magnetic head 104 senses the magnetic patterns recorded on that portion of belt 120 passing adjacent to the magnetic head 104, and applies the signals corresponding to such patterns through the "Voice Record" switch 20–4 (n.o.) to the input terminal A of the amplifier 231.

After amplification, such signals are passed from an output terminal L of the amplifier 231 through the "Auto Dial" switch 24–2 (op.) to the input terminal K of a third stage of the amplifier 231. Such amplified signals are further amplified and then passed from the output terminals D and E of the amplifier 231 to a pulsing relay 240.

A pulsing relay contact 209, which is normally closed, is connected in series with the dial pulsing contact 211 of the dial mechanism 14. The contacts 209 and 211 are connected serially across the terminals F and RR of telephone set 11 by way of the "Dial Record" switches 23–3 (n.o.) and 23–6 (n.o.). The pulsing relay contact 209 is arranged so as to open and close in the same manner that the dial pulsing contact 211 does (i.e., it opens and closes as the finger wheel 9 returns to its rest position). When the magnetic belt 120 has been rotated by the drive motor 131 for approximately 2½ seconds, the switch 140–2 (n.o.) is rendered inoperative by the strip 121. Consequently, the potential source 250 is disconnected from the motor-lamp combination 131–25 and from the amplifier 231.

Subsequently, the key of the "Auto Dial" switch assembly 24 is released, causing the "Auto Dial" switch 24–1 (n.o.) to assume its normal rest condition, while the "Auto Dial" switch 24–2 (op.) remains in its operative condition. At this time, A.C. potential is applied through the "Auto Dial" switch 24–1 (n.o.), the "Dial Record" switch 23–1 (n.o.), the switch 140–2 (n.o.) and the ringer relay contact 201 (n.o.), to the motor-lamp combination 131–25, and through the "Dial Record" switch 23–4 (n.o.) and the "Restore" switch 22 (n.o.) to the terminal H of the amplifier 231. As a result, the drive motor 131 rotates the magnetic belt 120, while the read and record element 206 of the magnetic head 104 senses the magnetic patterns previously recorded on the portion of magnetic belt 120 passing adjacent to the magnetic head 104.

If the key of the "Auto Dial" switch assembly 24 is not held depressed, but is released approximately ½ second after the motor 131 is initially energized, as described above, the switch 140–3 (op.) is operated ¼ of a second later by the strip 121. Consequently, A.C. potential is applied to the motor 131, to the lamp 25 and to the amplifier 231 by way of the "Auto Dial" switch 24–1 (n.o.), the "Dial Record" switch 23–1 (n.o.), the switch 140–3 (op.) and the ringer relay contact 201 (n.o.). After the motor 131 has been energized for 2½ seconds, the switch 140–2 (n.o.) is rendered inoperative by the strip 121, thus placing the switch 140–2 (n.o.) and the switch 140–3 (op.) in parallel to each other with respect to the drive motor 131.

The switch 140–3 (n.o.) becomes inoperative ¼ of a second later, at which time A.C. potential is applied through the "Auto Dial" switch 24–1 (n.o.), the "Dial Record" switch 23–1 (n.o.), the switch 140–2 (n.o.), and the ringer relay contact 201 to the motor 131, and through the "Dial Record" switch 23–4 (n.o.) and the "Restore" switch 22 (n.o.) to terminal H of the amplifier 231. Consequently, the motor 131 rotates the magnetic belt 120, and the read and record element 206 of the magnetic head 104 senses magnetic patterns previously recorded on the belt and applies signals corresponding to such patterns through the "Voice Record" switch 20–4 (n.o.) to the amplifier 231.

When signals pass through the amplifier 231, they are applied to the pulsing relay 240, which determines the open and closed conditions of the pulsing relay contact 209. The pulsing relay contact 209, the dial pulsing contact 211 and the "Dial Record" switches 23–3 (n.o.) and 23–6 (n.o.) then are connected across a pair of terminals F and RR of the telephone set 11. Consequently, since the dial pulsing contact 211 and the pulsing relay contact 209 are connected serially across the terminals F and RR, the operation of the contact 209, like that of the contact 211, causes the telephone set 11 to provide calling or pulsing signals for instituting a call to a distant station at the terminals T and R of the telephone line. After one full revolution of the magnetic belt 120, the switch 140–2 (op.) is actuated by the strip 121 and thus removes the A.C. potential from the drive motor 131 and the amplifier 231.

*Auto Answer*

Once an audio signal has been recorded in the information storage assembly 18, the repertory caller 10 may be placed in its "Auto Answer" condition by locating the desired "Automatic Answer Message" index strip 34 within the slot 36 and depressing the key of the "Auto Answer" assembly 21, while the handset 12 is positioned on its cradle 13. As previously mentioned, the "Auto Answer" switch assembly 21 is of the momentary-make type. Accordingly, when the key of the "Auto Answer" assembly 21 is released, the "Auto Answer" switch 21–1 (n.o.) assumes its normally open condition, while "Auto Answer" switches 21–2 (op.) and 21–3 (op.) are latched closed.

With the "Auto Answer" switch assembly 21 in such a condition, a ringing signal from the central office indicating an incoming call applied to the repertory caller 10 causes the telephone set 11 to ring in the conventional manner, while activating a ringer relay 202. The ringing voltage is applied by means of a resistor 230 and the "Auto Answer" switch 21–3 to a rectifier circuit 260 comprising a capacitor 232 and a diode 233, and also to the ringer relay 202 connected across the capacitor 232. Upon the rectification of the ringer voltage and the application thereof to the ringer relay 202, the ringer relay contact 201 (n.o.) assumes its operational condition. At this time, A.C. potential is applied to the motor-lamp combination 131–25 by means of the "Auto Dial" switch 21–1 (n.o.), the "Dial Record" switch 23–1 (n.o.), the switch 140–3 (n.o.), and the ringer relay contact 201 (o.p.).

Approximately ¼ of a second later the motor-lamp combination 131–25 is disconnected from the potential source 250 by the activation of the switch 140–3 (op.) by the strip 121. At this time, the potential source 250 is connected to the terminal H of the amplifier 231 by means of the "Auto Dial" switch 24–1 (n.o.), the "Dial Record" switch 23–1 (n.o.), the switch 140–3 (op.), the "Dial Record" switch 23–4 (n.o.), and the "Restore" switch 22 (n.o.).

Upon the termination of one cycle of ring pulses, the ringer relay 202 is no longer energized and the associated contact 201 (n.o.) assumes its normal inoperative condition. Consequently, the potential source 250 is connected to the motor-lamp combination 131–25 by means of the "Auto Dial" switch 24–1 (n.o.), the "Dial Record" switch 23–1 (n.o.), the switch 140–3 (op.) and the contact 201 (n.o.). The drive motor 131 rotates the magnetic belt 120 for approximately ¼ of a second longer and then the strip 121 places switch 140–4 (op.) in its operative condition. A.C. potential is applied at this time to the line hold relay 225 by means of the "Auto Answer" switch 21–2 (op.) and the switch 140–4 (op.) connected serially to one side of the energized drive motor 131.

When A.C. potential is applied to the line hold relay 225, the line hold contact 226 (n.o.) assumes a closed condition and, in so doing, connects a resistor 223 in shunt with the output terminals of the line amplifier 227, across telephone line terminals T and R. The resistor 223 permits a current of sufficient magnitude to flow in the telephone line to cause a line relay at the central office, to which the line is connected, to operate so as to indicate that the call has been answered. The incoming call is thus answered and the ringing signal terminates.

Further rotation of the magnetic belt 120 for approximately 2¼ seconds causes the strip 121 to place switch 140–1 (op.) in its inoperative condition, thus placing the switch 140–1 (n.o.) and switch 140–4 (op.) in parallel to each other with respect to the line hold relay 225. One fourth of a second later, the strip 121 causes the switch 140–2 (op.) to become inoperative, and the switch 140–2 (n.o.) and the switch 140–3 conduct a current to the motor-lamp combination 131–25. Consequently, the motor 131 rotates the magnetic belt 120 and the read and record element 206 of the magnetic head 104 senses magnetic patterns representative of a voice or audio signal previously recorded on the belt and applies electrical signals corresponding thereto through the "Voice Record" switch 20–4 (n.o.) to the input terminal A of the amplifier 231.

These signals are amplified in the various stages of the amplifier 231 and are then passed from the output terminal L of the amplifier 231 through the "Auto Dial" switch 24–2 (n.o.) to transformer 310. From the transformer 310 the amplified voice signals are again amplified by the line amplifier 227, and then are applied across the resistor 223, which is connected across the telephone line terminals T and R for signal transmission to the calling station.

One fourth of a second before the completion of one full revolution of the magnetic belt 120, the switch 140–1 (n.o.) is caused to become operative by the strip 121. As a result, the A.C. potential is removed from the line hold relay 225. The line hold contact 226 (op.) then assumes its open condition so as to disconnect the line amplifier 227 from the telephone line terminals T and R, and also removes the short circuit from the ringer relay 202. Further, the D.C. circuit including the resistor 223 is opened, thus causing the line relay at the distant central office to drop, indicating to such office that the repertory caller 10 is no longer answering an incoming call. After one full revolution of the magnetic belt 120 from its zero reference position, the switch 140–2 (n.o.) becomes operative due to the strip 121, and thus removes the A.C. potential from the drive motor 131, from the signal lamp 25, and from the terminal H of the amplifier 231.

KEY DIALING

Equipment embodying the present invention is also readily adapted for use with key types of dialing systems, such as the one designated "Touch-Tone" dialing. In such systems audible tones of two or more frequencies are employed in combinations as letter and/or digit signals to represent the letter and/or digits normally used for telephone dialing. The resulting multiple-frequency waveforms may be recorded and stored on the magnetic recording medium by depressing letter and/or digit keys on the "Touch-Tone" dial during "Dial Record."

Subsequently, the stored signals may be read back during automatic calling by the same procedure as is used for checking or reproducing a voice recording. The resulting signals can be used to operate switching mechanisms in the same manner as "Touch-Tone" signals are used in telephony.

ALTERNATIVE STRUCTURES

In FIGS. 13, 14 and 15, there is depicted an alternative design of record-erase block 105′ positioned about the threaded shaft 101. The record-erase block 105′ includes a plastic nut 107′ threaded on the shaft 101, and a bracket 108′ secured to the nut 107′ and arranged to act as a guide on the stabilizing rod 106. A magnetic head 104′ is mounted on the bracket 108′, and a bracket 103 straddles the bracket 108′ and the head 104′. To insure that the record-erase block 105′ moves axially along the shaft 101 as the shaft is rotated, while maintaining the magnetic head 104′ in close proximity to the magnetic belt 120, a leaf spring 113′ is positioned between the head 104′ and the juncture of the stabilizing rod 106 and the bracket 108′.

To achieve a fast return of the magnetic belt 120 to its zero rest position during a "Restore" operation, there may be provided a drive arrangement 130′ for obtaining two-speed, single-direction rotational movement of the magnetic belt 120. As depicted by FIGS. 16 and 17, the drive arrangement 130′ may comprise a planetary platform 301 positioned about drive shaft 132 in a manner enabling relative rotational movement between the platform and the shaft, a planetary pinion 302 and a spring pawl 303 attached to the platform 301. A sun gear 304 is positioned about and attached fixedly to the shaft 132 so as to engage the planetary pinion 302. Further, the drive arrangement 130′ comprises a ring-pulley gear 305 which engages the planetary pinion 302 and is slidably positioned about the shaft 132. A gear 305 and a spring pawl 303 are so formed that, upon the start of any counterclockwise rotation of the gear 305, the pawl 303 engages the gear 305 and restricts relative rotational movement between the gear 305 and the planetary platform 301. Additionally, there is provided a spring-loaded pawl 306, which engages the toothed circumference of the planetary platform 301 in a manner preventing counterclockwise rotation of the planetary platform 301 while permitting clockwise rotation.

For high-speed rotation of the drive belt 135 positioned about the outer circumference of the ring-pulley gear 305, the drive motor 131 is energized so as to rotate the drive shaft 132 in a clockwise direction, as seen in FIG. 17. As a consequence, the sun gear 304 rotates in a clockwise direction, the planetary pinion 302 tends to rotate in a counterclockwise direction, and the ring-pulley gear 305 tends to rotate counterclockwise. However, as the ring-pulley gear 305 starts to rotate counterclockwise, the spring pawl 303 engages the gear 305 so as to prevent relative rotational movement between the platform 301 and the gear 305. Consequently, the planetary pinion 302 attached to the platform 301 cannot rotate about its axis due to its mesh relation to the ring-pulley gear 305. Thus, there is a direct mechanical coupling between the sun gear 304 and the ring-pulley gear 305, and the ring-pulley gear 305 is rotated clockwise at the same speed and direction as that of the motor-driven shaft 132 to which the sun gear 304 is attached.

For slow-speed clockwise rotation of the drive belt 135, the drive motor 131 is energized so as to rotate the drive shaft 132 in a counterclockwise direction. As a consequence, the sun gear 304 rotates in a counterclockwise direction, and the planetary pinion 302 rotates in a clockwise direction to drive the ring-pulley gear 305 in the clockwise direction. The spring pawl 303 disengages from the gear 305 during such clockwise rotation of the gear 305, and the spring-loaded pawl 306 engages the planetary platform 301 in a manner restricting counterclockwise rotation of the platform. Accordingly, the planetary pinion 302 is positioned fixedly with respect to sun gear 304, but rotates about its axis as do gears 304 and 305. Thus, the gear train including the gears 302, 304 and 305 operates internally to provide a speed reduction so as to drive the ring-pulley gear 305 in a clockwise direction at a speed slower than that of drive shaft 132.

It will be appreciated that the above-described embodiments are merely illustrative of the principles of the invention. Other suitable arrangements may be devised by persons skilled in the art without departing from the spirit and scope of the invention.

What is claimed is:
1. In an apparatus for storing information:
an endless magnetic storage belt mounted for motion along a closed path;
a transducer recording head mounted adjacent to said magnetic storage belt for motion transverse to said closed path;
an endless index belt;
means for mounting said endless index belt for motion relative to and encircling said endless magnetic storage belt to receive and store visible information thereon;
means for moving (1) said endless index belt relative to said endless magnetic storage belt, and (2) said transducer recording head means transverse to said closed path; and
means for moving said endless magnetic storage belt along said closed path relative to said transducer recording head means to record and store information on said endless magnetic storage belt.

2. In a visual and magnetic information storage means:
a visual display index belt;
means for mounting said visual display index belt for movement to store and display successive items of information;
a magnetic storage belt mounted for movement along a path, said magnetic storage belt being susceptible of receiving and storing magnetically recorded information patterns on successive longitudinal bands, each of said bands being parallel to said path;
a transducer pickup and recording head mounted for movement transverse to said longitudinal bands;
means for advancing said visual index belt to display said successive items of information;
means operated by said advancing means for moving said head transversely into alignment with one of said longitudinal bands; and
means for moving said magnetic storage belt longitudinally along said path past said transducer head means.

3. A repertory caller comprising:
a telephone set including a dialing mechanism and a line connector;
a manual switching means for selectively operating said caller;
a multichannel information storage means connected to said telephone set and said manual switching means for magnetically recording information including dialing informations and voice signals, and for generating signal replicas of such recorded informations and signals for automatic dialing or for automatic answering, said storage means including:
  roller means;
  an endless magnetic belt positioned about said roller means and adapted to be moved thereby;
  transducer means positioned adjacent to and adapted to have a portion thereof moved transversely with respect to said magnetic belt; and
  an index member upon which may be inscribed legible informations associated with said dialing informations, said index member having a transverse portion thereof and being operatively linked to said transducer means in a manner associating a distinct longitudinal memory band of said magnetic belt to said transverse portion;
switching means positioned with respect to said magnetic belt so as to be responsive to the movements thereof;
relay switching means connected to said manual switching means and responsive to incoming calls to said telephone set; and
a drive arrangement coupled to said roller means and connectible to a source of electrical potential in accordance with the electrical conditions of said manual switching means, said belt-actuated switching means, and said relay switching means.

4. A repertory caller comprising:
a telephone set including a dialing mechanism and a line connector;
manual switching means for selectively operating said caller;
multichannel information storage means connected to said telephone set and said manual switching means for magnetically recording information including dialing informations and for generating signal replicas of such informations for automatic dialing, said storage means including:
  roller means;
  an endless magnetic belt positioned about said roller means and adapted to be moved thereby;
  transducer means positioned adjacent to and adapted to have a portion thereof moved transversely with respect to said magnetic belt; and
  an index member upon which may be inscribed legible informations associated with said dialing informations, said index member having a transverse portion thereof and being operatively linked to said transducer means in a manner associating a distinct longitudinal memory band of said magnetic belt to said transverse portion;
switching means positioned with respect to said magnetic belt so as to be responsive to the movements thereof; and
a drive arrangement coupled to said roller means and connectible to a source of electrical potential in accordance with the electrical conditions of said manual switching means and said belt-actuated switching means.

5. A repertory caller comprising:
a telephone set including a receiver, a transmitter and a dialing mechanism;
manual switching means for selectively conditioning said caller for magnetically recording dialing informations and audio signals, and for generating signal replicas of such recorded informations and signals;
multichannel information storage means for recording said informations and signals magnetically, said storage means including:
  a movable magnetic belt;
  a movable index belt;
  means for selectively moving said magnetic belt; said index belt independently of each other; and
  transducer means responsive to said telephone set and to said manual switching means, said transducer means including a magnetic transducer positioned adjacent to and movable across said magnetic belt and being coupled to said index belt for positioning said magnetic transducer adjacent to a distinct transverse location on said magnetic belt for each of a plurality of distinct longitudinal positions on said index belt;
switching means responsive to the movement of said magnetic belt for controlling the activation of said storage means;
relay switching means responsive to incoming calls to said repertory caller for controlling the activation of said storage means; and
a drive arrangement for moving said magnetic belt in response to said manual switching means, said belt-actuated switching means, and said relay switching means.

6. A repertory caller comprising:
a telephone set including a transmitter and a dialing mechanism;
manual switching means for selectively conditioning said caller for magnetically recording information including dialing informations, and for generating signal replicas of such recorded informations;

a multichannel information storage means for recording said informations magnetically, said storage means including:
- a movable magnetic belt;
- a movable index belt;
- means for selectively moving said magnetic belt and said index belt independently of each other; and
- transducer means responsive to said telephone set and to said manual switching means, said transducer means including a magnetic transducer positioned adjacent to and movable across said magnetic belt and being coupled to said index belt for positioning said magnetic transducer adjacent to a distinct transverse location on said magnetic belt for each of a plurality of distinct longitudinal portions on said index belt;

switching means responsive to the movement of said magnetic belt for controlling the activation of said storage means; and a drive arrangement for moving said magnetic belt in response to said manual switching means and said belt-actuated switching means.

7. A repertory caller in accordance with claim 6, wherein means are provided such that said dialing informations are magnetically recorded on said storage means at a series of alternating-current waveforms.

8. A repertory caller in accordance with claim 6, wherein said dialing mechanism has a normal rest condition but is operable to provide randomly and relatively widely spaced digit signals corresponding respectively to the digits of a multi-digit number, and means are provided such that said storage means is responsive to said dialing mechanism only when not in its normal rest condition for recording on said storage means magnetic patterns in uniformly and relatively closely spaced sequences representative of said digit signals.

9. A repertory caller in accordance with claim 8, wherein means are provided such that said dialing informations are magnetically recorded on said storage means as a series of uniformly and relatively closely spaced groups of alternating-current waveforms representative of said digit signals.

References Cited by the Examiner

UNITED STATES PATENTS

| 2,790,028 | 4/1957 | Muller et al. | 179—6 |
|---|---|---|---|
| 2,941,043 | 6/1960 | Ham et al. | 179—90 |
| 3,104,288 | 9/1963 | Kobler | 179—90.2 |

References Cited by the Applicant

UNITED STATES PATENTS

| 3,254,162 | 5/1966 | Miller et al. |
|---|---|---|

BERNARD KONICK, *Primary Examiner.*

IRVING L. SRAGOW, *Examiner.*

G. LIEBERSTEIN, T. W. FEARS, *Assistant Examiners.*